United States Patent Office 2,741,563
Patented Apr. 10, 1956

2,741,563
NOVEL ANTIOXIDANT AND INHIBITED WAX COMPOSITION

James M. Robertson, Port Arthur, Tex., assignor to The Texas Company, New York, N. Y., a corporation of Delaware No Drawing. Application September 26, 1952, Serial No. 311,797

5 Claims. (Cl. 106—270)

This invention relates to a novel 4-component antioxidant which imparts high thermal stability to paraffin waxes and food compositions, particularly fats and fatty acids. Paraffin wax compositions containing small concentrations of this antioxidant are characterized by exceptional oxidation resistance and thermal stability as indicated by their freedom from odors even after maintenance at elevated temperatures for substantial periods of time.

The novel antioxidant of this invention, which is characterized by unusual synergistic action, comprises 3 to 6 parts butyl hydroxyanisole, ½ to 2 parts propyl gallate, ½ to 2 parts citric acid and ½ to 2 parts ascorbic acid. The incorporation of 0.0004 to 0.002 per cent by weight of this novel antioxidant in paraffin wax yields a composition which possesses outstanding thermal stability, as indicated by its freedom from odors even after prolonged storage or use at elevated temperatures in the neighborhood of 200 to 250° F. The wax composition containing the prescribed amount of 4-component antioxidant not only possesses exceptional thermal stability, but does not display any characteristic additive odor.

It has been known prior to this invention that butyl hydroxyanisole alone is an effective antioxidant for waxes, foods and fatty acids. It has also been known that the addition of citric acid and propyl gallate increases the antioxidant and preservative properties of butyl hydroxyanisole in waxes, foods and fats. The specific improvement of this invention is the discovery of the unexpected and exceptional synergistic action resulting from the incorporation of a minor amount of ascorbic acid on the antioxidant and preservative properties of a butyl hydroxyanisole-citric acid-propyl gallate mixture. The addition of ascorbic acid to the butyl hydroxyanisole-citric acid-propyl gallate mixture more than doubles the effectiveness of this mixture as a wax preservative. The more than twofold increase in antioxidant power is completely unexpected in view of the small amount of ascorbic acid added to the composition.

The incorporation of the 4-component antioxidant in paraffin wax in an amount between 0.0004 and 0.002 per cent results in the formation of a superior wax composition which possesses exceptional thermal stability and is free from additive odor. The exceptional efficiency of the novel 4-component antioxidant permits the use of small concentrations of antioxidant with the result that the inhibited wax is substantially free of inhibitor odor. The retension of inhibitor odor is a major point of objection to some commercial inhibited waxes.

The ratio of components in the novel antioxidant of this invention is 3 to 6 parts butyl hydroxyanisole, ½ to 2 parts propyl gallate, ½ to 2 parts citric acid and ½ to 2 parts ascorbic acid. A mixture comprising 5 parts butyl hydroxyanisole, 1 part propyl gallate, 1 part citric acid and 1 part ascorbic acid is particularly active and has proven particularly effective in enhancing the thermal stability of paraffin wax.

A wax composition containing 0.0008 per cent of the antioxidant, consisting of butyl hydroxyanisole, propyl gallate, citric acid and ascorbic acid in a 5:1:1:1 ratio, is particularly free from antioxidant odor and can be maintained at a 250° F. level for more than 90 hours or at a 200° F. level for more than 45 days without developing a sour or burned odor.

Various butyl hydroxyanisole isomers can be used in the formulation of the preferred antioxidant of this invention. However, superior results have been obtained with the isomer identified as 2-tertiarybutyl-4-methoxy phenol having the following structural formula:

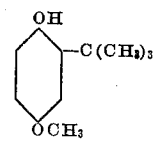

It has been discovered that the novel antioxidant is effective in preventing the development of odors by the auto-oxidation of the wax, but is not effective in masking the odor of oxygenated materials formed in the wax prior to the introduction of the antioxidant. Accordingly, the addition of the antioxidant as soon as possible after clay treatment, which removes impurities and oxygenated compounds from the wax, is recommended in order to impart maximum stability to the inhibited waxes.

The superior thermal stability of wax compositions containing the novel 4-component antioxidant was demonstrated by heat stability tests at 200 and 250° F. The heat stability test, which type is standard in the paraffin wax industry, is effected as follows:

⅔ of a pint of wax is introduced into a wide-mouth pint bottle which is covered with a watch glass and placed in a forced-draft oven maintained at a constant temperature level; at intervals, the bottle is removed from the oven and the odor of the contents noted after removal of the watch glass; the bottle, with watch glass replaced, is returned to the oven; the heat stability of the wax is the time required for it to develop a very slight sour or burned odor.

The samples are prepared for the heat stability test by direct addition of the inhibitor to the molten wax sample at a temperature between 140 and 160° F.; the inhibited samples are then stirred for 15 minutes to effect uniform distribution of the antioxidant throughout the samples. All of the wax samples had a total antioxidant concentration of 0.0008 per cent. The antioxidant compositions of each sample were as follows:

A.

4 parts propyl gallate
4 parts ascorbic acid

B.

6.7 parts of tertiary butyl hydroxyanisole (2-tertiary butyl-4-methoxy phenol)
1.3 parts ascorbic acid

C.

6.7 parts butyl hydroxyanisole
1.3 parts citric acid

D.

5.8 parts butyl hydroxyanisole
1.1 parts propyl gallate
1.1 parts citric acid

E.

5 parts butyl hydroxyanisole
1 part propyl gallate
1 part citric acid
1 part ascorbic acid In Table I, hereafter, there are shown the results obtained in the 250° F. heat stability test, which is an extremely severe test of the thermal stability of a wax. The numbers opposite the various wax compositions indicate the number of hours required for development of a slight sour odor in duplicate tests on each inhibited wax.

TABLE I

*250° F. heat stability test*

| | | |
|---|---|---|
| A | 32 hours | 48 hours. |
| B | 8 hours | 24 hours. |
| C | 24 hours | 28 hours. |
| D | 24 hours | 48 hours. |
| E | 96 hours | 96 hours. |

Table I clearly indicates that the addition of ascorbic acid to a mixture of butyl hydroxyanisole, propyl gallate and citric acid has an exceptional and unexpected synergistic action on the antioxidant properties of the resulting mixture. The wax composition designated E which contains the novel antioxidant of this invention is twice as stable under the severe conditions of the 250° F. heat stability test as any of the other compositions which contain equivalent concentrations of other 2- or 3-component mixtures of these ingredients. The improvement in the antioxidant effected by the incorporation of a small amount of ascorbic acid is certainly more than would be expected from the effect of ascorbic acid on other components such as is illustrated by Samples A and B.

Wax composition E containing the novel 4-component antioxidant of this invention did not develop an odor even after 91 days in the 200° F. heat stability test. In contrast, the other wax samples develop a slight burned or sour odor after less than about 45 days in the 200° F. heat stability test. The 200° F. heat stability data reinforce the conclusion that the novel wax composition of this invention containing the 4-component wax inhibitor is about twice as resistant to oxidation and thermal decomposition as the other compositions containing equivalent concentrations of 2- or 3-component mixtures of the ingredients employed in the instant novel 4-component inhibitor.

In the preparation of large quantities of the novel inhibited wax of this invention, it has been found advantageous to prepare an antioxidant concentrate. In the preparation of the inhibitor, 2 to 4 parts of propylene glycol or glycerine and a minor amount of water is added to the 4-component inhibitor comprising 3 to 6 parts butyl hydroxyanisole, ½ to 2 parts propyl gallate, ½ to 2 parts citric acid and ½ to 2 parts ascorbic acid; the propylene glycol and water are added to aid in solution of the antioxidant in wax. Sufficient of the inhibitor is added to the wax to give an inhibitor concentration of approximately 0.1 to 1 per cent; it has been found that a concentrate containing 0.25 per cent inhibitor can be readily prepared for manufacture of large batches of wax. The antioxidant concentrate is blended into the wax at a temperature between 150 and 180° F., after which the molten wax mixture is stirred at this temperature for a period of about 0.5 to 2 hours. Use of the inhibitor concentration in preparation of large batches of wax insures even distribution of the slightly soluble antioxidant throughout the total wax.

The term paraffin wax, as used in this application includes the hard macrocrystalline waxes, the microcrystalline petrolatum-type waxes and mixtures thereof. The novel antioxidant is particularly useful in imparting thermal stability to the hard macrocrystalline waxes and to mixtures of macrocrystalline and microcrystalline waxes. A small amount of microcrystalline wax often is added to hard wax to improve its paper coating characteristics.

The antioxidant can also be employed to inhibit and impart thermal stability to plant-derived ester-type waxes such as carnauba wax and sugar cane wax which are also subject to oxidative deterioration at elevated temperatures.

While the superior antioxidant and inhibiting properties of the novel 4-component inhibitor of this invention have been demonstrated in connection with paraffin waxes, it is reiterated that this novel antioxidant is also of demonstrable superiority in food compositions such as fats and fatty acids, both of which are prone to development of rancid odors on standing due to oxidative deterioration. The addition of ascorbic acid, vitamin C, to the previously known and used food antioxidants comprising butyl hydroxyanisole, propyl gallate and citric acid substantially improves their antioxidant power without adding thereto a component whose use is prohibited in foods.

Obviously many modifications and variations of the invention as set forth above may be made without departing from the spirit and scope thereof and therefore only such limitations should be imposed as are indicated in the appended claims.

I claim:

1. An antioxidant for wax and food compositions which comprises 3 to 6 parts of a tertiary butyl hydroxyanisole, ½ to 2 parts propyl gallate, ½ to 2 parts citric acid and ½ to 2 parts ascorbic acid.

2. An antioxidant of the type described in claim 1 which comprises 5 parts of a tertiary butyl hydroxyanisole, 1 part propyl gallate, 1 part citric acid and 1 part ascorbic acid.

3. A paraffin wax containing 0.0004 to 0.002 per cent antioxidant comprising 3 to 6 parts of a butyl hydroxyanisole, ½ to 2 parts propyl gallate, ½ to 2 parts citric acid and ½ to 2 parts ascorbic acid.

4. A wax composition as in claim 3 containing 0.0008 per cent antioxidant.

5. A paraffin wax of the type described in claim 3 in which the antioxidant comprises 5 parts of a butyl hydroxyanisole, 1 part propyl gallate, 1 part citric acid and 1 part ascorbic acid.

References Cited in the file of this patent

UNITED STATES PATENTS

| | | |
|---|---|---|
| 2,563,835 | Gribbin et al. | Aug. 14, 1951 |
| 2,564,106 | Gribbin et al. | Aug. 14, 1951 |
| 2,625,491 | Young et al. | Jan. 13, 1953 |